United States Patent [19]

Godlewski

[11] Patent Number: 4,703,082
[45] Date of Patent: Oct. 27, 1987

[54] INTEGRAL ADDITIVES AND METHODS FOR MAKING FILLED THERMOPLASTICS

[75] Inventor: Robert E. Godlewski, Mahopac, N.Y.

[73] Assignee: Union Carbide Corporation, Danbury, Conn.

[21] Appl. No.: 295,812

[22] Filed: Aug. 27, 1981

[51] Int. Cl.$^4$ .............................................. C09K 11/07
[52] U.S. Cl. ............................... 524/731; 252/188.31; 252/351; 524/730; 525/479; 526/194; 526/209; 526/279; 526/333
[58] Field of Search ................. 525/479; 524/730, 731; 526/194, 209, 279, 333; 252/188.3 R, 351

[56] References Cited

U.S. PATENT DOCUMENTS

| | | | |
|---|---|---|---|
| 3,250,813 | 5/1966 | Stephenson | 526/333 |
| 3,384,599 | 5/1968 | Omietanski et al. | 252/188.3 R |
| 3,471,439 | 10/1969 | Bixler et al. | 260/41 |
| 3,553,158 | 1/1971 | Gilfillan | 260/41 |
| 3,556,754 | 1/1971 | Marsden et al. | 525/477 |
| 3,663,493 | 5/1972 | Miller | 260/31.8 M |
| 3,853,692 | 12/1974 | Clayton et al. | 161/193 |
| 3,859,247 | 1/1975 | MacKenzie, Jr. | 260/42.15 |
| 4,017,452 | 4/1977 | Schwarz | 260/42.14 |
| 4,069,378 | 1/1978 | De Marco | 526/209 |
| 4,188,451 | 2/1980 | Humphrey, Jr. | 526/279 |
| 4,201,808 | 5/1980 | Cully et al. | 525/479 |
| 4,251,576 | 2/1981 | Osborn et al. | 428/331 |
| 4,287,227 | 9/1981 | Kamada et al. | 526/194 |

FOREIGN PATENT DOCUMENTS 879092 1/1980 Belgium .

OTHER PUBLICATIONS

"Surface Modification of Fillers and Reinforcement in Plastics", by E. P. Plueddemann and G. L. Stark, published by The Society of the Plastics Industry, Inc., 32nd Annual Technical Conference, 1977, (Sec. 4–C, pp. 1–9).

"Hydrophobic Filler Wetting a New Technique for Improved Composite Performance and Production", by D. E. Cope, published by The Society of the Plastics Industry, Inc., 34th Annual Technical Conference, 1979, (Sec. 24–E, pp. 1–3).

"Effect of Polymeric Additives on the Rheological Properties of Talc–Filled Polypropylene", by D. C. Goel, published in Feb. 1980, Polymer Engineering and Science, vol. 20, No. 3, pp. 198–201.

"Low Cost Highly Filled Impact Resistant Thermoplastic Composites", by A. S. de Souza, et al, 1979, Antec Spe, pp. 492–496.

Primary Examiner—Wilbert J. Briggs, Sr.
Attorney, Agent, or Firm—P. W. Luezzi

[57] ABSTRACT

Novel methods are described for providing filled thermoplastic polymers by the integral addition, to the polymer/filler mixture, of a surfactant with or without a polymerizable unsaturated silicon compound containing at least one ≡SiO-group and not more than five silicon atoms, e.g., a polymerizable unsaturated hydrolyzable silane, and/or a polymerizable unsaturated organic compound having two or more polymerizable unsaturated groups and novel filler/polymer compositions containing a surfactant are described. In addition novel integral additives containing surfactant and a polymerizable unsaturated silicon compound containing at least one ≡SiO-group and not more than five silicon atoms, e.g., a polymerizable unsaturated hydrolyzable silane, and/or a polymerizable unsaturated organic compound having two or more polymerizable unsaturated groups are described.

8 Claims, No Drawings

INTEGRAL ADDITIVES AND METHODS FOR MAKING FILLED THERMOPLASTICS

BACKGROUND OF THE INVENTION

1. Field Of The Invention

This invention relates to filled polymeric masses and more particularly relates to filled thermoplastic polymer matrices and to additives integrally added to the filler thermoplastic polymer blend for conserving or enhancing the physical properties of the filled thermoplastic polymer including improved impact strength. The invention also relates to novel integral additives for addition to filler-thermoplastic polymer blends for providing improved processing characteristics to the blend such as lower pressures required to fill molds in an injection molding operation. The invention also provides methods for producing reinforced or filled thermoplastic polymers of improved physical properties and relates to the resulting improved filled thermoplastic polymers.

2. Description Of The Prior Art

A very extensive amount of research has been performed on the treatment of fillers or reinforcing agents for synthetic polymers including thermoplastic polymers such as polyethylene, polypropylene and the like. Much of this research has been centered on pretreatment of the fillers with coupling agents such as gamma-methacryloxypropyl trimethoxysilane as described in U.S. Pat. No. 3,663,493; tetravinylcyclotetrasiloxane as disclosed in U.S. Pat. No. 3,859,247; mercapto-propyl or glycidyl propyl trimethoxysilanes as disclosed in U.S. Pat. No. 3,853,692; a diol comprising polyoxypropylene block sandwiched between two polyoxyethylene blocks as described in U.S. Pat. No. 4,017,452; maleic or methacrylic acid esters of polyether polyols as described in Belgian Pat. No. 879,092, and others. The pretreatment of fillers requires high shear mixing of the coupling agent with the finely divided filler which consumes large amounts of energy, time and extra processing, all of which is economically unattractive and contrary to energy conservation efforts.

Integral blending techniques (also called in situ addition) have also been widely used whereas coupling agent or surface treatment agent is added to a stirred mixture of polymer and filler. Integral blending however requires larger quantities of the coupling agent or surface treatment additive and is dependent on the specific type of filler and resin for success. In addition mixing time heretofore was quite extensive in the integral blending technique because the coupling agent requires time to migrate to the filler surface and react and condense there as described in the article, "Surface Modification Of Fillers And Reinforcement In Plastics", by E. P. Plueddemann and G. L. Stark, published by The Society of the Plastics Industry, Inc., 32nd Annual Technical Conference, 1977, (Sec. 4-C, pages 1–9). This article refers to a study of commercial surface active agents as used in the paint industry such as fatty acids, phosphate surfactants and the like in the hopes of developing a system in which one basic silane coupling agent on all fillers can be used and then modified as needed as surface active additives to obtain compatibility with individual polymers. However, the article fails to disclose any achievement of success with that approach and it may be assumed that the approach is still being researched.

There are considerable problems in using surfactant or wetting agents in integral or in situ additives. The article, "Hydrophobic Filler Wetting A New Technique For Improved Composite Performance And Production", by D. E. Cope, published by The Society of the Plastics Industry, Inc., 34th Annual Technical Conference, 1979, (Sec. 24-E, pages 1–3) discloses that surfactants generally do not react chemically at the filler surface and in fact they may be fugitive and may often result in porosity or bubbles and cites, as typical surfactants, sulphonates, phosphates and silicone oils. The article further states that the surfactants tend to cause adverse side effects.

Furthermore, U.S. Pat. No. 4,251,576 states in column 22, lines 22–27, that the use of nonyl phenol/ethylene oxide condensate in a monomer filler mixture flocculated the mix and resulted in a cracked, flawed casting.

In the article, "Effect of Polymeric Additives on the Rheological Properties of Talc-Filled Polypropylene", by D. C. Goel, published in February 1980, Polymer Engineering and Science, Vol. 20, No. 3, pages 198–201, work is reported in blends containing polypropylene, talc and an oligomer of polypropylene oxide were extruded twice on a single screw extruder for uniform distribution of the oligomer throughout the polymer/filler matrix. It was noted that at the level of 3 wt. % of oligomer in the polymer/filler matrix provided a decrease in viscosity and also provided a decrease in the elasticity of the filled polymer composite which suggests a possible reduction in impact properties.

The general teachings in the prior art therefore generally discourage the addition of surfactants to polymer/filler blends.

The Bixler et al U.S. Pat. No. 3,471,439 discloses finely divided non-reinforcing fillers, the particles of which are coated with an organic compound having a chemical affinity for the filler surface such as a material having at least one ethylenic unsaturation, with an organic compound having at least two polymerizable ethylenic unsaturations and a free radical generator. The filler then is dispersed in the thermoplastic polymer and the unsaturated material is polymerized to bond the filler to the polymer. The patent also discloses that saturated surface active compounds such as stearic acid, calcium stearate and the like can be used, particularly if they possess one or more carbon atoms from which a hydrogen atom can be abstracted by a free radical.

None of the prior art references identified above discloses or suggest any method that involves the addition of a surfactant of the type described and claimed herein to a mixture of thermoplastic polymer and filler for the purpose of improving processing characteristics such as pressure-to-fill requirements and conserving or enhancing physical properties.

SUMMARY OF THE INVENTION

It is known that various surface treatments, such as with silanes and/or organic coupling agents, particularly organo-functional silanes, may be applied to fillers for the purpose of enhancing their utility in polymeric matrices. The surface treatments with coupling agents are commonly applied to the filler surface in a separate operation, prior to incorporation of the filler into the polymer composite. It is an object of this invention to integrally add the surface treatments simultaneously in the filler/polymer blending cycle. This practice heretofore usually resulted in reduced efficiency of the functional additives as measured by mechanical properties of the filled composite. I have found that the use of silicone surfactants, as well as other non-silicone surfactants, recovered the efficiency loss of the surface treatments through integral addition. Further, the mechanical strength properties of some polymer/filler composites made pursuant to this invention are surprisingly superior to those of the unfilled polymer. This allows one to circumvent the undesireable and uneconomical practice of pretreating the particulate filler.

Integral blending an additive, like an organofunctional silane coupling agent, has a substantial economic advantage over a pre-treated filler which involves savings in time, and energy, and provides convenience and simplicity. Pre-treatment of a filler with an additive, e.g. a coupling agent, is a separate operation requiring a high intensity mixer like a Henschel or twin-shell blender equipped with a revolving high RPM intensifier mixing blade to prevent agglomeration. The additive must be added slowly at a steady flow rate to prevent agglomeration. During the pre-treatment step, localized high temperatures are encountered at or near the high speed mixing blades of the equipment employed. This prevents introducing a resin to the filler because the resin would melt and result in agglomeration.

Utilizing the integral blending technique, an additive must be capable of dispersing the filler and the additive must also be capable of being uniformly distributed throughout the filler. This prevents agglomeration. In integral blending according to this invention, the additive can be added rapidly (one-shot) to the filler or filler/resin mixture followed by gentle agitation. Low level usage of the additive, while still maintaining benefits of the additive, is a substantial and unexpected advantage of this invention. Furthermore, the additive can be integrally blended according to this invention directly into the processing equipment (e.g., Banbury) containing the filler/resin mixture and prior to the fluxing stage of the melt composite.

Heretofore, the addition of fillers to plastics often reduced some useful physical properties. Additives to the system are used to help regain some properties.

A key finding on which this invention is based is that the use of a surfactant alone or in combination with an unsaturated silane and/or with an unsaturated organic compound having two or more polymerizable unsaturated groups, produces unexpected and synergistic benefits. The prior art use of such silanes and/or the unsaturated organic compounds to improve filled plastics generally require pretreating the filler with the additives before compounding the filler with the plastic. Heretofore, integral blending of all ingredients at the same time usually gave poorer results. A special benefit of the surfactant pursuant to this invention is that it allows the simpler integral blending technique to be used, while properties comparable to, or better than, those resulting from the "pretreatment" method are achieved.

The present invention provides techniques, methods, and additive combinations which permit the integral blending of additives for filler/polymer composites for the enhancement of physical properties such as impact strength, tensile strength, etc. The present invention provides novel methods for reinforcing thermoplastic organic polymers such as polyethylene and polypropylene by blending the polymer, a finely divided filler and a surfactant which is a siloxane-polyoxyalkylene block copolymer or a siloxane containing at least one silicone bonded alkyl group of 12 or more carbon atoms or a polyoxyalkylene compound containing polyoxyalkylene blocks terminated at one end by an alkyl group having 12 or more carbon atoms or an alkenyl group and terminated at the other end by an alkoxy group or a hydroxy group. According to this invention, the novel method also includes the incorporation of an unsaturated silicon compound containing at least one polymerizable unsaturated group, at least one $\equiv$SiO-group and not more than 5 silicon atoms, e.g. a polymerizable unsaturated hydrolyzable silane coupling agent and/or an unsaturated organic compound containing two or more polymerizable unsaturated groups into the filler/polymer mixture to provide synergistic enhancement of the filled polymer physical properties. The invention is hereinafter described in specific reference to silanes of the type described above which are the preferred polymerizable unsaturated silicon compounds; however, as disclosed hereinafter relatively low molecular weight vinyl-polymerizable unsaturated polysiloxane oligomers can be used in place of or in addition to the above-mentioned silanes.

The present invention also provides novel integral additives for improving the physical properties of filler/polymer blends. The novel integral additives contain a silane coupling agent, i.e., a polymerizable unsaturated hydrolyzable silane or a polymerizable unsaturated organic compound or both in addition to a surfactant of the type described above.

The invention also provides filled thermoplastic organic polymeric compositions produced through the use of the integral additives described herein.

DETAILED DESCRIPTION OF THE INVENTION

In accordance with this invention the surfactant with or without the polymerizable unsaturated hydrolyzable silane or siloxane oligomer and/or the polymerizable unsaturated organic compound is conveniently added to the mixture of filler and polymeric matrix, e.g., the thermoplastic polymer, at ambient temperatures in a suitable mixing apparatus such as a Hobart mixer to uniformly distribute the components throughout the matrix. If desired, the surfactant and the other additives can be incorporated into the filler by ordinary mixing without the need for a high shear operation or it can be mixed with the polymeric matrix which is in granular or powder form. All of these mixing operations can be performed at any convenient time or point in the formulation procedure. The surfactant can also be added to the polymeric matrix before, during or after its formation by polymerization. The surfactant as well as the above-mentioned unsaturated silane and/or organic compound can be added to the coarse filler material as it is received from the mine and such addition can be performed before, during or after grinding the filler to the desired particle size. An advantage of this invention is that the point of addition of the surfactant and the above-mentioned polymerizable unsaturated hydrolyzable silane and/or organic compound can be conducted at the most convenient and economical point in the overall formulation procedure including additions as pointed out above to the starting materials prior, during or after their formation or processing. It is a further advantage of this invention that the polymerizable unsaturated hydrolyzable silane and/or organic compound does not need to be matched to the particular type of fillers, e.g. acid or base types, as need be done by prior art pre-treatment procedures such as that disclosed in U.S. Pat. No. 3,471,439. Selections can thus be made from a wider variety of polymerizable unsaturated hydrolyzable silanes and/or organic compounds.

The amounts of surfactant and polymerizable unsaturated hydrolyzable silane and/or polymerizable unsaturated organic compound employed are not narrowly critical. In the novel integral additive the amount of surfactant can vary from 5 to 95 wt. %, the amount of polymerizable unsaturated hydrolyzable silane can vary from 0 to 90 wt. % and the amount of polymerizable unsaturated organic compound can also vary from 0 to 90 wt. %. The combined amount of said silane and said organic compound can vary from 5 to 95 wt. %. All of said wt. percentages are based on the combined weight of said surfactant, said silane (if any present) and said organic compound (if any present). The amount of surfactant based on the weight of filler can vary from 0.1 wt. % to 5 wt. %. The specific amount of surfactant that produces optimum results will vary depending on the filler type and amount. The amount of polymerizable unsaturated hydrolyzable silane employed in the methods and compositions of this invention can vary from 0.05 to 10 PHF, preferably 1 to 3 PHF. The polymerizable unsaturated organic compound can be present in the amount of 0.05 through 7 or 8 PHR, preferably 0.1 through 5 PHF.

Surfactants that are useful in the present invention include polysiloxanes containing per molecule at least one silicon-bonded alkyl group of at least 12 carbon atoms, as generally represented by the average formula:

$$R_3SiO[R_2SiO]_x[R_w(C_nH_{2n+1})_{2-w}SiO]_ySiR_3$$

wherein R is monovalent hydrocarbon of 1 to 12 carbon atoms, preferably methyl, n is an integer of at least 12 and preferably not more than 24, w is an integer of 0 or 1, preferably 1, x is an integer of at least 1, preferably 10 or more, and y is an integer of 1 or more, preferably at least 10. R, w and n can be the same or different throughout each molecule.

Additional surfactants useful in this invention are the polyoxyalkylene compounds having one or more polyoxyalkylene blocks each bonded at one end to a siloxane block, an alkyl group having at least 12 carbon atoms, or an alkenyl group, and bonded at the other end to an alkoxy group, a siloxane block or a hydroxy group. These surfactants include the "hydrolyzable" polysiloxanepolyoxyalkylene block copolymers such as the block copolymers described in U.S. Pat. Nos. 2,834,748 and 2,917,480 (disclosures incorporated by reference) and the "non-hydrolyzable" polysiloxane-polyoxyalkylene block copolymers such as the block copolymers described in U.S. Pat. Nos. 3,505,377 and 3,686,254, and British patent specification No. 1,220,471 (disclosures incorporated by reference). These various polysiloxanepolyoxyalkylene block copolymers preferably contain from 5 to 50 weight percent of polysiloxane polymer with the remainder being polyoxyalkylene polymer.

A preferred class of polysiloxane-polyoxyalkylene block copolymers are those represented by the average formula:

$$R_3SiO[R_2SiO]_s\left[\begin{array}{c}RSiO\\|\\(C_mH_{2m}O)_pR'\end{array}\right]_t SiR_3$$

wherein R' is a monovalent hydrocarbon group having 1 to 18 carbon atoms or an alkanoyl group having 1 to 18 carbon atoms, R is as defined above, s is an integer of 1 or more, preferably 1 to 100, t is an integer of 1 or more, preferably 1 to 100, m is an integer of 2 or more, preferably 2 or 3, p is an integer of 2 or more, preferably 2 to 40, and R, R', m, and p may be the same or different throughout the same molecule.

Additional polyoxyalkylene surfactants useful in this invention can be represented by the average formula:

$$R''O(C_mH_{2m}O)_pR'''$$

wherein R'' is an alkyl group of at least 12 carbon atoms, preferably 12 to 18 carbon atoms or an alkenyl group having 2 or more carbon atoms, preferably 3 to 18 carbon atoms, such as, allyl, R''' is hydrogen, alkyl having 1 to 18 carbon atoms or alkanoyl having 1 to 18 carbon atoms, and m is as defined above and can be the same or different throughout the same molecule.

Specific surfactants that are useful in this invention are described hereinafter as Surfactants I through VI. Useful surfactants also can include polyoxyalkylene polyols of a wide range of molecular weights such as polyoxyethylene glycol, polyoxypropylene glycol, or polyoxyethylenepolyoxypropylene glycol in which the ethyleneoxy groups and propyleneoxy groups are randomly distributed in the molecular chain or in which blocks of two or more ethyleneoxy groups are connected to blocks of propyleneoxy groups. Liquid surfactants are preferred over solid surfactants.

The polysiloxane-polyoxyalkylene block polymer surfactants are preferred. The polyoxyalkylene chains or blocks can comprise all ethyleneoxy units or all propyleneoxy units or units of both randomly dispersed throughout the block or assembled into sub-blocks of ethyleneoxy units and sub-blocks of propyleneoxy units. Preferred polysiloxane-polyoxyalkylene block copolymers are those having the higher molecular weight polysiloxane blocks.

In the polysiloxane surfactants including the polysiloxane-polyoxyalkylene block copolymer surfactants suitable for use in this invention, any valences of silicon not satisfied by a divalent oxygen of a ≡SiOSi≡ linkage or by a polyoxyalkylene block through a ≡SiC≡ or ≡SiOC≡ linkage is satisfied by a monovalent hydrocarbon group having at least one carbon atom and preferably 1 to 18 carbon atoms. Thus, the surfactants are not limited to any molecular configuration and can be linear, branched, cyclic, etc.

The polymeric matrices to which this invention is applied include any of the rubbers, resins or plastics with which fillers are conventionally employed. Such polymers include natural rubber; synthetic rubbers such as styrene-butadiene rubber; ethylene-propylene terpolymer rubber; urethane rubbers; polyolefins such as polyethylene, polypropylene, and polyisobutylene; poly-acrylonitrile; polybutadiene; copolymers of butadiene and acrylonitrile; polystyrene; poly(styreneacrylonitrile); copolymers of styrene with butadiene and acrylonitrile; copolymers of ethylene with propylene or butene-1 or vinyl acetate or maleic anhydride; polycarbonate resins; phenoxy resins, polyvinyl chloride; copolymers of vinyl chloride with vinyl acetate or other vinyl esters; polyvinyl acetate; linear polyesters; polyvinyl acetals; polyvinylidene chloride; copolymers of vinylidene chloride with vinyl chloride and acrylic acid; poly(methyl methacrylate); superpolyamides, e.g. nylon; polysulfones; allyl resins such as a polymer of diallyl phthalate; epoxy resins, phenolic resins; silicone resins; polyester resins including alkyd resins; poly(vinylacetate-vinyl chloride); poly(vinylidene chloride); thermoplastic polyurethanes; thermoplastic polyhydroxy ethers; thermoplastic polyesters; poly(vinyl chloride-maleic anhydride); and others. Preferred polymers are the thermoplastic polymers, such as the polyolefins, e.g., polyethylene, polypropylene, and the like. The invention can be used in thermoset resins.

Fillers used in the polymeric matrix are known to those skilled in the art and include any suitable finely divided or particulate inorganic substance. At the time of incorporation into the polymeric matrix most fillers may be in the form of finely divided particles. They may be approximately isometric, having a maximum diameter, i.e., a maximum linear dimension of ten microns, preferably five microns; or they may be in the form of plates or needles (fibers) having a thickness or diameter of ten microns or less, preferably five microns or less. Compositions containing larger particles tend to be highly abrasive to processing equipment when in molten form and may be undesirable or less preferred for this reason. The minimum size of the filler particles is not critical, any of the conventionally used fillers being suitable in this respect. Among the specific fillers which may be used in the present invention are asbestos, ground glass, kaolin and other clay minerals, silica, calcium silica, calcium carbonate (whiting), magnesium oxide, barium carbonate, barium sulfate (barytes), metal fibers and powders, glass fibers, refractory fibers, non-reinforcing carbon blacks, titanium dioxide, mica, talc, chopped glass, alumina, quartz, wollastonite (calcium silicate), and inorganic coloring pigments.

Polymerizable unsaturated organic compounds having at least two polymerizable unsaturated groups include any organic compound of this description which does not contain any group or element which would adversely affect the function of the polymeric matrix, e.g., the thermoplastic polymer; the filler; the vinyl-polymerizable unsaturated, hydrolyzable silane; or any other component such as stabilizers, antioxidants that customarily may be used in the matrix. Suitable unsaturated organic compounds include ester diol 2,4-diacrylate, 1,4 butylene glycol diacrylate, diethylene glycol dimethacrylate, triallyl-s-triazine-2,4,6-(1H, 3H, 5H)-trione, triallyl mellitoate, pentaerythritol triacrylate, polycaprolactone triacrylate, m-phenylene bis maleimide, dipentaerythritol pentaacrylate, melamine triacrylate, epoxidized linseed oil/acrylate, triacryloyl hexahydro-s-triazine, trimethylolpropane trimaleate, trimethacryloyl hexahydro-s-triazine, N,N-tetraacryloyl 1,6-diaminopyridine, 1,3-butylene glycol dimethacrylate, 1,3-butylene glycol diacrylate, ethylene glycol dimethacrylate, ethylene glycol diacrylate, diethylene glycol diacrylate, triethylene glycol diacrylate, polyethylene glycol dimethacrylate, polyethylene glycol diacrylate, trimethylol propane trimethacrylate, trimethylol propane triacrylate, divinyl sulfone, dicyclopentadiene, bisallyl glycol dicarbonate, triallyl cyanurate, acetyl triallyl citrate, divinyl benzene, diallyl phthalate, tetraallyl methylenediamine, tetraallyl oxyethane, 3-methyl-1,4,6-heptatriene; 1,10-decamethylene glycol dimethacrylate, di-, tri-, tetra-, and penta-acrylates of poly(vinyl alcohol), and the like. In addition, the following low molecular weight, polyunsaturated polymers may be used: polybutadiene oligomers, hydroxyl terminated polybutadiene oligomers, hydroxyl terminated styrene-butadiene and acrylonitrilebutadiene oligomers, unsaturated polyesters, partial allylic esters of styrene-maleic anhydride oligomers and the like.

It is preferred to employ polymerizable unsaturated organic compounds that have a high unsaturated level to molecular weight ratio. Therefore, the tri—, tetra—, and penta-acrylates of poly(vinyl alcohol) and the other tri—, tetra—, and penta-acrylates and methacrylates of polyols such as pentaerythritol and dipentaerythritol as described hereinabove are preferred.

The vinyl-polymerizable unsaturated, hydrolyzable silanes used in this invention contain at least one silicon-bonded hydrolyzable group, e.g., alkoxy, halogen, acryloxy, and the like, and at least one silicon-bonded vinyl-polymerizable unsaturated group such as, vinyl,-gamma-methacryloxypropyl, alkenyl, gamma-acryloxypropyl, 6-acryloxyhexyltriethoxysilane, allyloxypropyl, ethynyl, 2-propynyl and others, and preferably is an ethylenically unsaturated group. Any remaining valences of silicon not satisfied by a hydrolyzable group or a vinyl-polymerizable unsaturated group being satisfied by a monovalent hydrocarbon group, such as methyl, ethyl, propyl, isopropyl, butyl, pentyl, isobutyl, isopentyl, octyl, decyl, cyclohexyl, cyclopentyl, benzyl, phenyl, phenylethyl, naphthyl, and the like. Suitable silanes of this type include those represented by the formula:

$$R_aSiX_bY_c$$

wherein R is a monovalent hydrocarbon group, X is a silicon-bonded hydrolyzable group, Y is a silicon-bonded monovalent organic group containing at least one vinylpolymerizable unsaturated bond, a is an integer of 0 to 2, preferably 0; b is an integer of 1 to 3, preferably 3; c is an integer of 1 to 3, preferably 1; and a+b+c is equal to 4.

Suitable vinyl polymerizable unsaturated hydrolyzable silanes that can be used in this invention include vinyltriethoxysilane, gamma-methacryloxypropyltrimethoxysilane, vinyltri(2-methoxyethoxy)silane, vinyltrimethoxysilane, vinyltrichlorosilane, gamma-methacryloxypropyltri(2-methoxyethoxy)silane, gamma-acryloxypropyltriethoxysilane, vinyltriacetoxysilane, ethynyltriethoxysilane,

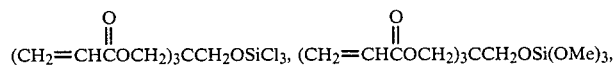

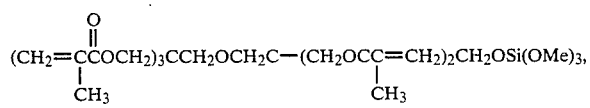

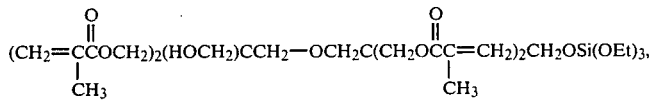

2-propynyltrichlorosilane, and others. It is believed that the silicon-bonded hydrolyzable groups of the silanes react via hydrolysis with groups such as hydroxy group or water contained by the fillers to more strongly attach the silane to the filler. In addition, the silanes containing higher amounts (ratios) of unsaturated group level to molecular weight are preferred. For example, the tri-, tetra-, or penta-acrylate or methacrylate derivatives of pentaerythritol or dipentaerythritol can be reacted with trichlorosilane or tetrachlorosilane to provide silanes having high ratios of unsaturated group level to molecular weight. Relatively low molecular weight polysiloxane oligomers such as the poly(methylvinylsiloxane) tetramer can be used in place of the polymerizable unsaturated hydrolyzable silane. If a particular unsaturated polymerizable hydrolyzable silane or for that matter a particular polymerizable unsaturated organic compound is too volatile, another one can be easily substituted. If volatility is a problem it is also possible to reduce the volatility and eliminate the problem by reaction of the silane or organic compound with the filler prior to mixing it with the polymer and processing same.

Relatively low molecular weight vinyl-polymerizable unsaturated polysiloxane oligomers that can be used in place of or in addition to the vinyl-polymerizable unsaturated, hydrolyzable silanes and can be represented by the average formula:

wherein R and Y are as defined hereinabove, d is an integer of 0 or 1, e is an integer of 1 to 4, f is an integer of 0 to 3, g is an integer of 0 or 1, e+f+g is an integer of 1 to 5, and d can be the same or different in each molecule. The oligomers covered by this formula include the cyclic trimers, cyclic tetramers and the linear dimers, trimers, tetramers and pentamers.

The vinyl-polymerizable unsaturated silicon compounds, thus, contain one to 5 silicon atoms, interconnected by $\equiv$SiOSi$\equiv$ linkages when said compounds contain multiple silicon atoms per molecule, contain at least one silicon-bonded vinyl-polymerizable unsaturated group and are hydrolyzable, in the case of silanes, by virtue of at least one silicon-bonded hydrolyzable group. Any valences of silicon not satisfied by a divalent oxygen atom in a $\equiv$SiOSi$\equiv$ linkage, by a silicon-bonded hydrolyzable group or by a silicon-bonded vinyl-polymerizable unsaturated group is satisfied by a monovalent hydrocarbon group free of vinyl-polymerizable unsaturation. The vinyl-polymerizable unsaturated, hydrolyzable silanes are preferred in most cases.

Preferred additive compositions include mixtures of a surfactant as described herein and a reinforcement promoter as described and claimed in copending application entitled "Reinforcement Promoters For Filled Thermoplastic Polymers" (D 13274) filed concurrently herewith by Fred H. Ancker, Arnold C. Ashcraft, Jr., Martin S-M Leung and Audrey W. Ku, U.S. Pat. No. 4,385,136 (Ancker I), the disclosure of which is incorporated herein by reference. Such reinforcement promoters have at least two reactive olefinic double bonds, said promoter being characterized by having a promoter index, P, being greater than zero, which is defined by the formula:

$$P = n(n-1)Q(e+2)(1-2R_f) - 2.5$$

wherein n is the number of olefinic double bonds in the promoter, Q and e are the Alfrey-Price resonance and polarity parameters, respectively of at least one of the olefinic double bonds in the compound, and $R_f$ is the relative flow ratio of the promoter measured by thin layer chromatography on a neutral silica gel using xylene as the eluant and di-n-butyl fumarate as the standard. The amount of surfactant can range from 5 to 95 wt. % and the amount of reinforcement promoter can range from 5 to 95 wt. %, based on the combined weights of surfactant and promoter. The resulting mixtures are then useable in organic polymer/filler mixtures in the manner described herein.

Additional preferred compositions include mixtures of a surfactant as described herein and at least two interfacial agents as disclosed and claimed in copending application entitled "Synergistic Reinforcement Promoter Systems For Filled Polymers" (D 13303) filed concurrently herewith by Fred H. Ancker, Arnold C. Ashcraft, Jr. and Eric R. Wagner, Ser. No. 295,813, filed Aug. 27, 1981, now U.S. Pat. No. 4,409,342 (Ancker II), the disclosure of which is incorporated herein by reference. In such additionally preferred compositions:

(a) said agents are capable of copolymerization with each other;

(b) at least one agent contains at least one reactive olefinic double bond capable of mechanico-chemical grafting to the polymer;

(c) one agent is more highly adsorbable onto the filler surface while the other agent is more highly soluble in the filled polymer; and (d) said agents have a synergy index, S, being greater than zero, which is defined by the formula:

$$S = 50 (Q_A + Q_S - 0.2)(1 - 10R_f)(0.5 - \Delta^2)$$

wherein $Q_A$ and $Q_S$ are the Alfrey-Price resonance parameters of the most reactive olefinic double bonds in the adsorbable and soluble agents, respectively; $R_f$ is the relative flow ratio of the adsorbable agent measured by thin layer chromatography on a neutral silica gel using xylene as the eluant and di-n-butyl fumarate as the standard, and $\Delta$ is the difference between the Hildebrand solubility parameter of the soluble agent and that of the polymer.

The amount of surfactant can range from 5 to 95 wt. % and the combined amounts of interfacial agents can range from 5 to 95 wt. %, based on the combined weights of said surfactant and all said interfacial agents. The amounts of interfacial agents relative to each other can range from 5 to 95 wt. % of one and 5 to 95 wt. % of the other, based on the combined weights of the two. The resulting mixtures of surfactant and interfacial agents are useable in organic polymer/filler blends in the manner described herein.

The following Examples are presented. The numbered Examples represent the present invention; the lettered Examples do not represent this invention and are for comparison purposes. Temperatures given are in ° C. unless otherwise stated. The following designations used in the Examples and elsewhere herein have the following meanings:

psi: pounds per square inch
%: percent by weight unless otherwise specified
g: grams
wt: weight
parts: parts by weight unless otherwise indicated
pts: parts by weight unless otherwise indicated
pbw: parts by weight
ppm: parts by wt. per million parts by wt.
Ft-lbs/in: ft. pounds per inch
In-lbs/in: inch pounds per inch
HDPE (0.78)—High density polyethylene having a melt index of 0.78
HDPE (0.15)—High density polyethylene having a nominal melt index of 0.15
PP—Polypropylene (Hercules, Inc., Pro-Fax 6253 PM), an isotactic homopolymer containing a proprietary stabilizer package. PM designates Pre-Mix or powdered form.
PP-1—Polypropylene (Hercules, Inc., Pro-Fax 6501), an isotactic homopolymer containing no stabilizer.
PP-2—unstabilized isotactic polypropylene homopolymer sold under name of Vestolen P-5200.
PP-3—highly stabilized isotactic polypropylene homopolymer sold under name of Vestolen P-5200.
STABILIZER CONCENTRATE XX23—A stabilizer concentrate from Hercules, Inc. 1.5 phr is recommended for filled PP.
ATH—Alumina trihydrate—In all cases, grade RH-730 from Alcoa, Inc. was utilized. Nominal 2$\mu$ average particle size precipitated filler.
ATOMITE—Calcium Carbonate supplied by Cyprus Mines, Inc. Nominal 2.5$\mu$ average particle size.
CLAY—Suprex from J. M. Huber Corp. Nominal 0.3$\mu$ average particle size. A hydrous clay.
BEAVERWHITE 200—Talc from Cyprus Mines, Inc. Nominal 7.5$\mu$ average particle size. Particle size range 0.2–70$\mu$.
BEAVERWHITE 325—Talc from Cyprus Mines, Inc. Nominal 6.5$\mu$ average particle size. Particle size range 0.1–44$\mu$.
TALC (EMTal 500)—Vermont talc from Engelhard Minerals, Inc. Nominal 9$\mu$ Avg. particle size.
MICA (GRADE 200HK)—A Suzorite mica from Martin Marietta Resources, Ltd.
WOLLASTONITE(GRADE NYAD-G)—From NYCO Products, Inc.—a 20:1 aspect ratio calcium silicate ¼″ CHOPPED GLASS—nominal ¼″ length glass from PPG Industries. Designated grade PPG-3130.
MAPTS—gamma-methacryloxypropyltrimethoxysilane, $$CH_2=C(CH_3)-C(O)-O(CH_2)_3Si(OCH_3)_3$$

VTS—Vinyltriethoxysilane, $CH_2=CHSi(OC_2H_5)_3$
TTA—Trimethylol propane triacrylate, $$CH_2=CH-C(O)-OCH_2-C(CH_2CH_3)(CH_2-O-C(O)-CH=CH_2)_2$$

Surfactant I $$CH_3-SiO[(CH_3)_2SiO]_{13}[CH_3(C_3H_6O(C_2H_4O)_7H)SiO]_{5.5}Si(CH_3)_3$$

Surfactant II $$CH_2=CH-CH_2-O(C_2H_4O)_7H$$

Surfactant III $$CH_3-SiO[(CH_3)_2SiO]_1[CH_3(C_3H_6O(C_2H_4O)_7CH_3)SiO]Si(CH_3)_3$$

Surfactant IV $$CH_3-SiO[(CH_3)_2SiO]_7[CH_3(C_3H_6O(C_3H_6O)_{12.5}C_4H_9)SiO]_3Si(CH_3)_3$$

Surfactant V $$CH_3-SiO[(CH_3)_2SiO]_{40}[CH_3(C_{18}H_{37})SiO]_{40}Si(CH_3)_3$$

Surfactant VI—Tergitol primary alcohol, 12–15 carbon length alcohol reacted with ethylene oxide to give 7 moles of ethylene oxide per molecule.

$$C_{12-15}H_{25-31}O(C_2H_4O)_7H$$

Additive I—Mixture of MAPTS, TTA and Surfactant I in the respective weight ratio of 1½.
Additive II—Mixture of MAPTS, TTA and Surfactant I in the respective weight ratio of 1/1/0.3.
TTS—Isopropyl triisostearoyl titanate.

$$CH_3-CH(CH_3)-O-Ti(O-C(=O)-iC_{17}H_{35})_2-O-C(=O)-(CH_2)_{14}-CH(CH_3)-CH_3$$

TEST PROCEDURES:

Tensile @ Yield
Tensile @ Break
Elongation @ Yield ASTM D638
Elongation @ Break
Tensile Modulus
Izod Impact ASTM D256
Flexural Modulus
Flexural Strength ASTM D790
- Gardner Impact—Described in Materials Engineering, Nov. 1973, under title "Gardner Impact vs. Izod—Which is Better for Plastics" by V. Abolins, G. E. Corp.

HDT @ 264 psi—ASTM D648
- $S^2I$ Index—Described in Monsanto U.S. Pat. No. 3,419,517. The higher the $S^2I$ index, the tougher the material.
- Pressure to Fill—The minimum injection pressure needed to completely fill an ASTM mold so that a minimum of flash is encountered during the complete filling of the mold during injection molding. A measure of the ease of processing.
- Charpy Impact—ASTM D256
- PHF—Parts per hundred filler, by weight
- PHR—Parts per hundred resin (polymer), by weight.
- Pre-Treated—Method of applying silane or other liquids to treat or coat finely divided filler prior to adding to thermoplastic.
- Pre-Treated (IH)—IH means Intensive Hydrolysis. The use of acidified MeOH/$H_2O$ during the pretreatment with silane or other liquids to coat filler. Acetic acid is commonly used to obtain pH 4–5.
- Integral Addition—The simple incorporation of liquid or solid additives to a mixture of filler and polymer while agitating the mixture before, during or after the preparation. Hobart mixer is typically used to agitate.

EXAMPLES 1–3 and A–E

In Examples 1, 2 and 3 the amounts of gammamethacryloxypropyltrimethoxysilane, (MAPTS), shown in Table I, trimethylol propane triacrylate, (TTA), and Surfactant I, were blended directly into a mixture of high density polyethylene, (HDPE), and alumina trihydrate, (ATH), (60% ATH based on total weight of HDPE and ATH) in a Hobart mixer. The contents of the Hobart were gently mixed for 10 to 15 minutes and the resulting blend was then melted in a Banbury mixer and molded into test specimens. Examples 1–3 represent the integral addition of the additives to the HDPE-/ATH blend. Physical properties were determined on the test specimens produced.

In Example A no filler was used and physical properties given in Table I were determined on the unfilled HDPE. In Examples B–E, 60 weight percent of ATH filler was blended with the HDPE. In Example B, the control, no other additives were used. In Examples C and D the ATH filler was pretreated by high intensity blending of the filler with the MAPTS and TTA in a twin shell blender.* The high intensity mixer is necessary to prevent agglomeration and the additive was added slowly at a steady flow rate to prevent agglomeration. Due to the high intensity mixing, i.e., the high speed mixing blades of the equipment employed, localized high temperatures are encountered at or near the high speed mixing blades and therefore prevents introduction of the resin to the filler at this stage because the resin itself would melt and would result in agglomeration. In the integral addition used in Examples 1–3, the additives were capable of dispersing the filler an were uniformly distributed throughout the filler/polymer mixture to prevent agglomeration. In the integral addition the additive was added rapidly, for example, in one shot to the mixture without agglomeration or other adverse effects. Test specimens were molded from the mixtures of Examples B-E and physical properties were measured as given in Table I.

*Model No. LB-S-8, made by Patterson-Kelly Company, Inc., East Stroudsberg, Pa. 18301.

The physical properties of the filled HDPE of Examples 1–3 of this invention were equivalent to or superior physical properties of the filled polymer containing pretreated filler, i.e., Examples C and D and were superior in the $S^2I$ index and other physical properties to the integral addition of Example E in which no surfactant was added. The highest $S^2I$ index and Izod impact were recorded for Example 2 which represents this invention. Tensile strength at yield and flexural strength for Example 2 were the highest recorded of any of the examples. These examples show that pretreatment of ATH filler with a mixture of 0.5 PHF each of MAPTS and TTA results in HDPE composites with superior properties to the unfilled HDPE and the control composite containing filler but no additives. In addition, such pretreatment of ATH filler results in HDPE composites having superior flexural strength compared to the composite where the same amounts of MAPTS and TTA were integrally blended. The integral addition of MAPTS, TTA and surfactant in Example 2 resulted in a composite having properties superior to the properties of all other composites made in this series.

TABLE I

| ATH FILLED POLYETHYLENE HDPE (0.78 MI) | | | | | | | | |
|---|---|---|---|---|---|---|---|---|
| Example | A | B | C | D | E | 1 | 2 | 3 |
| ATH Filler, wt % | 0 | 60 | → | → | → | → | → | → |
| MAPTS, PHF | — | — | 0.5 | 0.5 | 0.5 | 0.5 | 0.5 | 0.5 |
| TTA, PHF | — | — | 0.5 | 0.5 | 0.5 | 0.5 | 0.5 | 0.5 |
| Surfactant I, PHF | — | — | — | — | — | 0.2 | 0.5 | 1.0 |
| | | Control | Pre-Treated | Pre-Treated(IH) | INTEGRAL ADDITION | | | |
| Tensile @ Yield, psi | 3160 | 1160 | 4590 | 4450 | 4290 | 4320 | 4860 | 4670 |
| Elongation @ Yield, % | 10 | 0.3 | 5.6 | 5.2 | 6.3 | 6.4 | 9.3 | 9.7 |
| Tensile Modulus, × $10^3$ psi | 129 | 555 | 350 | 336 | 333 | 344 | 361 | 337 |
| Tensile @ Break, psi | 1910 | 2320 | 3440 | 3340 | 4290 | 4320 | 4320 | 4180 |
| Elongation @ Break, % | 29 | 0.7 | 30 | 32 | 44 | 25 | 31 | 20 |
| Flexural Strength, psi | 4600 | 4600* | 8820 | 8370 | 7050 | 8510 | 9210 | 8260 |
| Flexural Modulus, psi × $10^3$ | 159 | 389 | 422 | 550 | 435 | 539 | 525 | 529 |
| Notched ¼" Izod, Ft-lbs/in | 3.9 | 0.4 | 5.0 | 5.1 | 4.6 | 4.2 | 5.2 | 3.4 |
| HDT @ 264 psi, °C. | — | 70 | 66 | 70 | — | — | 67 | 68 |

TABLE I-continued

ATH FILLED POLYETHYLENE HDPE (0.78 MI)

| $S^2I$ Index $\times 10^6$ | 82.5 | 8.46 | 389 | 357 | 229 | 304 | 441 | 232 |
|---|---|---|---|---|---|---|---|---|

NOTE:
IH = Intensified Hydrolysis (Acidified MeOH/H₂O)
*@ Break (All others @ 5% Strain).

EXAMPLES 4–15 and F–K

Six different fillers were used in composites made from high density polyethylene using 40% of each type of filler in each instance based on the total weight of filler and HDPE. The type of filler is listed in Table II below. In each of Examples F–K the filler was employed without any additives or pretreatment and these examples are designated as control examples. In each of Examples 4, 6, 8, 10, 12 and 14, Surfactant I in the amount of 0.75 PHF was blended in with the filler and HDPE gently prior to fluxing the HDPE to form the melt composite. In each of Examples 5, 7, 9, 11, 13 and 15, 1.5 PHF of Additive I was gently mixed with a blend of HDPE and 40% of the filler before fluxing to form the melt composite. In each case the mixtures were uniformly blended, melted and formed into test specimens. The impact properties of the test specimens were measured and are presented in Table II. In all instances the Gardner impact strength for Examples 4–15 were at least as great and in most instances were much greater than the Gardner impact strength of the corresponding control test specimen. These results show the clear superiority of the integral addition of Surfactant I and Additive I over corresponding composites made without the benefit of the integral addition of surfactant or additive. In addition, it is noted that the amount of Surfactant I in Examples 4, 6, 8, 10, 12 and 14 appear to be at the optimum level whereas the level of Additive I was at less than optimum level in most cases.

In Examples 16–21 the types and amounts of surfactants as identified in Table III were gently blended into the mixture of ATH filler and polypropylene powders to form a uniform blend. In Examples 17, 18, 20 and 21, 2.5 PHF of MAPTS was added with the designated surfactant and in Example 19 0.7 PHF of MAPTS and 0.3 PHF of TTA were added with the designated surfactant to the blend prior to fluxing to melt the polypropylene.

In Example L no additive was used in the 60% ATH in polypropylene blend. In Example M 2.5 PHF and MAPTS were added to the 60% ATH in polypropylene blend. After mixing each blend was fluxed to melt the polypropylene and molded into test specimens. Each specimen was tested for physical properties and the results are given in Table III. In each instance the integral addition of surfactant with or without MAPTS resulted in composites having an improved Gardner impact strength when compared to the control Example L containing no additives without sacrifice in the other physical properties listed in Table III. The integral addition of MAPTS and surfactant in Examples 17–21 provided a synergistic improvement in the Gardner impact strength at virtually no sacrifice in the other physical properties listed when compared to the control Example L and Example M in which MAPTS was integrally added. In addition, processing of the composites containing the surfactants, i.e., Examples 18–21, was improved because the resulting composites provided a much lower pressure-to-fill mold during injection molding, as compared to the control Example L where the composite was unable to fill a mold even under a pressure 18,980 psi. In each case the processing test was carried out by initially processing each composite of

TABLE II

40% of Assorted Fillers in Polyethylene HDPE (0.15)

| Example | F | 4 | 5 | G | 6 | 7 | H | 8 | 9 |
|---|---|---|---|---|---|---|---|---|---|
| Filler | CaCO₃ (Atomite) | | | ¼" Chopped Glass (PPG-3130) | | | Mica (200 HK) | | |
| Additive | Control | Surf. I | Add. I | Control | Surf. I | Add. I | Control | Surf. I | Add. I |
| Notched Izod ft-lbs/in. | 2.8 | 6.4 | 5.7 | 1.3 | 2.2 | 2.3 | 0.8 | 1.1 | 0.9 |
| Gardner Impact in-lbs/in | >1300 | >1300 | >1300 | 653 | 800 | 658 | 127 | 483 | 467 |

| Example | I | 10 | 11 | J | 12 | 13 | K | 14 | 15 |
|---|---|---|---|---|---|---|---|---|---|
| Filler | Wollastonite (NYAD-G) | | | Clay (Suprex) | | | Talc (Emtal 500) | | |
| Additive | Control | Surf. I | Add. I | Control | Surf. I | Add. I | Control | Surf. I | Add. I |
| Notched Izod ft.-lbs/in. | 1.3 | 1.5 | 1.5 | 0.5 | 0.6 | 0.6 | 0.8 | 0.7 | 0.8 |
| Gardner Impact in-lbs/in. | 512 | 768 | 793 | 402 | 471 | 587 | 295 | 410 | 558 |

0.1 PHR each of Irganox 1010 and Weston 399 stabilizers added to each formulation as recommended
NOTES:
Surf. I held constant at 0.75 PHF.
Add. I held constant at 1.5 PHF.
Control contained filler and HDPE (0.15) only.

EXAMPLES 16–21 and L and M

In these examples the basic composite used was polypropylene filled with 60% alumina trihydrate, (ATH), based on the total weight of polypropylene and ATH.

Examples L and 18–21 on a roll mill at 380° F. followed by injection molding. The composite of Example 20 had the highest Gardner impact value, i.e., 454 in-lbs/in. as compared to 71 in-lbs/in. of the Example M composite which contained the same amount of MAPTS but no surfactant. The $S^2I$ index of the composite of Example 19 and Izod impact strength of the Example 19 composite was superior to any other composite in this series.

TABLE III

| | 60% ATH FILLED POLYPROPYLENE PP* | | | | | | | |
|---|---|---|---|---|---|---|---|---|
| Example | L | 16 | M | 17 | 18 | 19 | 20 | 21 |
| MAPTS, PHF | — | — | 2.5 | 2.5 | 2.5 | 0.75 | 2.5 | 2.5 |
| TTA, PHF | — | — | — | — | — | 0.3 | — | — |
| Surf. I, PHF | — | 0.5 | — | 0.5 | — | — | — | — |
| Surf. II, PHF | — | — | — | — | 0.5 | 0.5 | — | — |
| Surf. IV, PHF | — | — | — | — | — | — | 0.5 | — |
| Surf. VI, PHF | — | — | — | — | — | — | — | 0.5 |
| Tensile @ Yield, psi | 3020 | 3090 | 3420 | 3310 | 3135 | 3410 | 3115 | 3160 |
| Elongation @ Yield, % | 0.71 | 0.77 | 0.91 | 1.02 | 1.12 | 0.64 | 0.96 | 1.10 |
| Tensile @ Break, psi | 2860 | 2770 | 3300 | 3060 | 3000 | 3410 | 3000 | 3010 |
| Elongation @ Break, % | 0.87 | 0.94 | 1.00 | 1.15 | 1.25 | 1.36 | 1.14 | 1.27 |
| Flexural Strength, psi | 5990 | 6350 | 6700 | 6350 | 6860 | 7020 | 6520 | 6640 |
| Tensile Modulus, psi × $10^3$ | 678 | 706 | 722 | 628 | 610 | 576 | 624 | 640 |
| Flexural Modulus, psi × $10^3$ | 527 | 578 | 576 | 529 | 569 | 575 | 565 | 511 |
| Notched Izod (¼"), ft-lbs/in | 0.23 | 0.18 | 0.18 | 0.22 | 0.24 | 0.27 | 0.26 | 0.23 |
| Gardner Impact, in-lbs/in | 36 | 57 | 71 | 164 | 357 | 443 | 454 | 372 |
| $S^2I$ Index × $10^6$ | 8.25 | 7.26 | 8.08 | 8.87 | 11.3 | 13.3 | 11.1 | 10.1 |
| Pressure to Fill, psi | Unable to fill mold @ 18980 psi | — | — | — | 8541 | 10439 | 9490 | 12337 |

*1.5 PHR of XX23 stabilizer concentrate added to each formulation as recommended by manufacturer

EXAMPLES 22–32 and N–P

In each of these examples except Examples 22 and 27, the amounts of MAPTS as shown in Table IV were incorporated by gentle mixing into polypropylene mixed with 60 wt. percent alumina trihydrate, based on the combined weight of polypropylene and ATH. In Examples 22–32 the amounts of Surfactant I shown in Table IV were also gently mixed with the 60% ATH-polypropylene mixture. After thorough mixing each mixture was fluxed, processed into the melt form in a Bratender Torque Rheometer, and compression molded into test specimens. Each test specimen was tested for Gardner impact strength and the results are given in Table IV. The results given in Table IV show that in each case where equivalent amounts of MAPTS were used, those composites also containing Surfactant I were far superior in Gardner impact strength than composites containing an equivalent amount of MAPTS but no Surfactant I. A comparison of Examples N and 24 illustrate that as little as 0.5 PHF of Surfactant I almost doubles the Gardner impact strength. At the level of 2 PHF of MAPTS, the use of 0.5 Surfactant I more than doubles the Gardner impact strength, compare Example 25 and Example P.

TABLE IV

| | 60% ATH FILLED POLYPROPYLENE PP* | | | | | | | | | | | | | |
|---|---|---|---|---|---|---|---|---|---|---|---|---|---|---|
| Example | N | O | P | 22 | 23 | 24 | 25 | 26 | 27 | 28 | 29 | 30 | 31 | 32 |
| MAPTS, PHF | 1.0 | 1.5 | 2.0 | — | 0.5 | 1.0 | 2.0 | 3.0 | — | 0.5 | 1.0 | 1.5 | 2.5 | 3.0 |
| Surf. I, PHF | — | — | — | 0.5 | 0.5 | 0.5 | 0.5 | 0.5 | 1.0 | 1.0 | 1.0 | 1.0 | 1.0 | 1.0 |
| Gardner Impact Strength, in-lb/in | 46 | 35 | 46 | 23 | 46 | 90 | 101 | 91 | 23 | 51 | 58 | 81 | 91 | 57 |

*1.5 PHR XX23 stabilizer concentrate in each formulation.

EXAMPLES 33 and 34 and Q–S

In these examples 70% of calcium carbonate (Atomite) filler was blended with polypropylene. In Example Q no additives were used. In the remaining Examples, 2.6 PHF, MAPTS and 2.6 PHF of MAPTS were integrally blended with the calcium carbonate in polypropylene blend. In addition, in Examples 33 and 34, 0.5 PHF of the surfactants designated in Table V were integrally blended with the calcium carbonate in polypropylene blend. In Example S, 0.5 PHF of TTS was integrally mixed with the calcium carbonate in polypropylene blend. As seen in control Example Q, the incorporation of 70% calcium carbonate produces a composite that is difficult to process by injection molding because of the high pressure-to-fill requirement. The integral incorporation of MAPTS and TTA does not improve processing as shown by the pressure-to-fill requirement of Example R. When TTS is integrally incorporated there is only a slight improvement in the pressure-to-fill requirement but there is essentially no improvement in the $S^2I$ index or Izod impact. The integral blending of a surfactant as shown in Examples 33 and 34 very significantly reduces the pressure-to-fill requirement and provides very high $S^2I$ index values and increased Izod impact as well as Gardner impact as compared to Examples Q and R. The composite of Example 33 was the only composite exhibiting a tensile strength at yield value which is a measure of the elastic component of the composite. In regard to tensile strength at break, the composite of Examples 33 and 34 increased 71 to 77% compared to only a 9% improvement for TTS (Example S). The composites of Examples 33 and 34 improved in flexural strength from 54 to 61% over the control Example Q composite and the TTS composite Example S showed essentially no improvement. Furthermore, the Examples 33 and 34 composites showed improvements of 87% and 97% in Izod impact strength over the control composite whereas the TTS composite was virtually the same or less in Izod impact strength. In respect to Gardner impact strength, the composites of Examples 33 and 34 were higher by 164% and 239% respectively compared to the control Example Q. The results of Table V illustrate that the best balance of properties is shown by the Examples 33 and 34 composites.

TABLE V

| 70% CaCO$_3$ (ATOMITE) FILLED POLYPROPYLENE PP* | | | | | |
|---|---|---|---|---|---|
| Example | Q | R | 33 | 34 | S |
| MAPTS, PHF | — | 2.6 | 2.6 | 2.6 | 2.6 |
| TTA, PHF | — | 2.6 | 2.6 | 2.6 | 2.6 |
| Surf. V, PHF | — | — | 0.5 | — | — |
| Surf. II, PHF | — | — | — | 0.5 | — |
| TTS, PHF | — | — | — | — | 0.5 |
| Tensile @ Yield, psi | 0 | 0 | 4280 | 0 | 0 |
| Elongation @ Yield, % | 0 | 0 | 1.62 | 0 | 0 |
| Tensile @ Break, psi | 2470 | 4370 | 4260 | 4220 | 2690 |
| Elongation @ Break, % | 0.30 | 1.36 | 1.74 | 1.52 | 0.62 |
| Flexural Strength, psi | 4960 | 7990 | 8110 | 7660 | 4990 |
| Flexural Modulus, psi × 10$^3$ | 789 | 650 | 685 | 641 | 618 |
| Notched Izod (¼"), ft-lbs/in | 0.30 | 0.50 | 0.56 | 0.58 | 0.28 |
| S$^2$I Index × 10$^6$ | 7.38 | 31.9 | 36.8 | 34.0 | 6.97 |
| Gardner Impact, in-lbs/in | 28 | 68 | 74 | 95 | 128 |
| HDT @ 264 psi, °C | 104 | 109.2 | 100.8 | 108.2 | 90.4 |
| Pressure to Fill**, psi | 13760 | 13760 | 7592 | 7592 | 11388 |

*1.5 PHR XX23 stabilizer concentrate added to each formulation
**Injection molding conditions were 3 zone barrel temp. @ 450° F. each. Mold temp. 150° F.

Examples 35, T and U

Three composite blends were prepared from polypropylene and 70% calcium carbonate (Atomite), based on the weight of polypropylene and calcium carbonate, by melt compounding in a Banbury mixer. To the blend of Examples U and 35 there were integrally added 0.11 PHF of MAPTS and 0.11 PHF of TTA. In addition, to the blend of Example 35 was added integrally 0.21 PHF of Surfactant I. The blends were processed in the Banbury mixer. Each blend was then injection molded into test specimens. The physical properties were measured and are given in Table VI below. The test specimens of Example 35 illustrated a Gardner impact strength at least three times higher than that of the control Example T and higher than Example U. In addition the other measured properties of tensile at yield and tensile at break were higher for the composite of Example 35 than for the composites of Examples T and U.

TABLE VI

| 70% CaCO$_3$ (ATOMITE) FILLED POLYPROPYLENE PP* | | | |
|---|---|---|---|
| Example | T | U | 35 |
| MAPTS, PHF | — | 0.11 | 0.11 |
| TTA, PHF | — | 0.11 | 0.11 |
| Surf. I, PHF | — | — | 0.21 |
| Tensile @ Yield, psi | NO YIELD | NO YIELD | 2460 |
| Tensile @ Break, psi | 2380 | 2520 | 2940 |
| Gardner Impact, in-lbs/in | 77 | 200 | 244 |

*1.5 PHR XX23 Stabilizer concentration added to each formulation

Examples 36–41, V and W

The composites of these examples were prepared from polypropylene and 40% clay (Suprex) based on the combined weight of polypropylene and clay. No further additives were made to the composite of Example V. In Examples W and 36–41, 5.0 PHF of TTA were integrally blended into the te in a Hobart mixer. In each of Examples 36–41 0.5 PHF of the surfactants identified in Table VII were added and each composite was mixed to provide a uniform blend. Thereafter, they were melted and formed into test specimens. The physical properties of the specimens were measured and are given in Table VII. These results show that the addition of surfactant in Examples 36–41 greatly reduce the pressure-to-fill of the blends compared with the blends of Examples V and W which do not contain surfactant. Furthermore, the advantage of greatly reduced pressure-to-fill requirements were obtained in Examples 36–41 without significant sacrifice in the other physical properties.

TABLE VII

| 40% CLAY (SUPREX) FILLED POLYPROPYLENE PP* | | | | | | | | |
|---|---|---|---|---|---|---|---|---|
| Example | V | W | 36 | 37 | 38 | 39 | 40 | 41 |
| TTA, PHF | — | 5.0 | 5.0 | 5.0 | 5.0 | 5.0 | 5.0 | 5.0 |
| Surf. I, PHF | — | — | 0.5 | — | — | — | — | — |
| Surf. II, PHF | — | — | — | 0.5 | — | — | — | — |
| Surf. III, PHF | — | — | — | — | 0.5 | — | — | — |
| Surf. V, PHF | — | — | — | — | — | 0.5 | — | — |
| Surf. IV, PHF | — | — | — | — | — | — | 0.5 | — |
| Surf. VI, PHF | — | — | — | — | — | — | — | 0.5 |
| Tensile @ Yield, psi | 4180 | 4820 | 4790 | 4830 | 4740 | 4900 | 4880 | 4850 |
| Elongation @ Yield, % | 2.48 | 2.94 | 2.81 | 3.06 | 2.96 | 3.03 | 2.99 | 3.00 |
| Tensile @ Break, psi | 3850 | 4530 | 4470 | 4470 | 4500 | 4550 | 4480 | 4580 |
| Elongation @ Break, % | 4.21 | 4.13 | 4.17 | 4.83 | 4.17 | 5.02 | 5.04 | 4.47 |
| Flexural Strength, psi | 8300 | 9350 | 9130 | 9110 | 8440 | 8580 | 8570 | 8560 |
| Tensile Modulus, psi × 10$^3$ | 342 | 360 | 348 | 344 | 340 | 344 | 349 | 349 |
| Flexural Modulus, psi × 10$^3$ | 526 | 576 | 564 | 555 | 522 | 529 | 540 | 553 |
| Notched Izod (¼"), ft-lbs/in | 0.25 | 0.49 | 0.53 | 0.57 | 0.53 | 0.48 | 0.50 | 0.55 |
| S$^2$I Index × 10$^6$ | 17.2 | 42.8 | 44.2 | 47.3 | 37.8 | 35.3 | 36.7 | 40.3 |
| Pressure to Fill**, psi | 11388 | 11388 | 5694 | 5694 | 5219 | 4270 | 4270 | 4270 |

*1.5 PHR XX23 Stab. Conc. and 1.0 PHR Araldite 7072 stabilizer added to each formulation
**Mold Temp. 100° F.; Barrel Temp. @ 3 zones 450° F. (Front, Center, Rear).

EXAMPLES 42, X AND Y

Three blends were prepared from polypropylene powder and 40% talc (Beaverwhite 325) and about 1.5 PHR of the stabilizer identified in Table VIII. In the blends of Examples Y and 42, 0.68 parts of VTS based on 60 weight parts of polypropylene was added to each blend and in Example 42 0.33 weight part of Surfactant I based on 60 weight parts of polypropylene was added. Each mixture was blended thoroughly, melted and injection molded under the conditions given in Table VIII. The pressure-to-fill requirements for each blend is given in Table VIII and it is clear that the pressure-to-fill requirement of the blend of Example 42 is much lower than either of the other two blends.

TABLE VIII

PRESSURE TO FILL FOR 40% TALC (BEAVERWHITE 325) FILLED POLYPROPYLENE

| | Example | | |
|---|---|---|---|
| | X | Y | 42 |
| | Parts by Weight | | |
| PP* | 60 | 60 | 60 |
| Beaverwhite 325 (Talc) | 41 | 41 | 41 |
| VTS | — | 0.68 | 0.68 |
| Surf. I. | — | — | 0.33 |
| Pressure to Fill**, psi | 14235 | 5694 | 4745 |

*1.5 PHR stabilizer concentrate XX 23 added to each formulation
**During the following injection molding conditions:
3 zone barrel Temp., °F.: 500, 500, 500
Mold Temp., °F.: 115

EXAMPLES 43, AA AND BB

In each of these examples blends were made from polypropylene, talc and stabilizer concentrate in the amounts given in Table IX. In the blends of Examples BB and 43, 2.5 parts by weight of MAPTS were added and in Example 43 0.5 part by weight of Surfactant I was added. Each blend was processed in a Banbury mixer and injection molded under the conditions listed in Table IX. The pressure-to-fill requirements were measured for each blend and are given in Table IX. The pressure-to-fill requirement for the blend of Example 43 was significantly below that for each of the other two blends.

TABLE IX

PRESSURE TO FILL FOR TALC (BEAVERWHITE 200) FILLED POLYPROPYLENE

| | Example | | |
|---|---|---|---|
| | AA | BB | 43 |
| | Parts by Weight | | |
| PP | 48.54 | 48.54 | 48.54 |
| Stabilizer Conc. XX23 | 1.46 | 1.46 | 1.46 |
| Talc, Beaverwhite 200 | 50 | 50 | 50 |
| MAPTS | — | 2.5 | 2.5 |
| Surf. I | — | — | 0.5 |
| Pressure to Fill*, psi | 7592 | 6169 | 5694 |

*During the following injection molding conditions:
3 zone barrel temp., °F.: 450, 450, 450
Mold Temp., °F.: 115

EXAMPLES 44–46 AND CC-EE

Blends were prepared from 100 weight parts of polypropylene and 100 weight parts of calcium carbonate as identified in Table X. In addition, to the blends of Examples 44–46, 2 parts by weight of Additive II were added. All blends were thoroughly mixed using the mixing cycle identified in Table X. In each of the blends of Examples 44-46 containing Additive II, the tensile strength at yield, the flexural yield strength and Izod impact strength were significantly higher than the strengths for the corresponding blends of Examples CC-EE which did not contain Additive II. The results given in Table X also illustrate that mixing cycle 3 which involves mixing at high speed to the flux state and for 60 seconds after the flux state before discharge provides the best Gardner impact strength without significant sacrifice of the other properties.

TABLE X

50% CaCO₃ FILLED POLYPROPYLENE (UNSTABILIZED)

| | CC | 44 | DD | 45 | EE | 46 |
|---|---|---|---|---|---|---|
| Example | Parts by Weight | | | | | |
| PP-1 (Pro-Fax 6501) | 100 | 100 | 100 | 100 | 100 | 100 |
| CaCO₃ (Vicron 15-15) | 100 | 100 | 100 | 100 | 100 | 100 |
| Additive II | — | 2.0 | — | 2.0 | — | 2.0 |
| Banbury (Size 00) Mixing Cycle (see note) | 1 | 1 | 2 | 2 | 3 | 3 |
| Tensile @ Yield, psi | 3120 | 4380 | 3120 | 4440 | 3140 | 4440 |
| Elongation @ Yield, % | 1.7 | 4.4 | 1.7 | 4.4 | 1.7 | 5.0 |
| Flexural Yield Strength, psi | 6110 | 7970 | 6100 | 8060 | 5990 | 7910 |
| Tangent Flexural Modulus, psi × 10³ | 492 | 458 | 451 | 461 | 451 | 471 |
| Gardner Impact Strength, in-lbs/in | 128 | 104 | 144 | 120 | 128 | 232 |
| Notched Izod Impact Strength, ft-lbs/in | 0.42 | 0.56 | 0.49 | 0.63 | 0.42 | 0.59 |

NOTE:
Mixing Cycle 1 - Mix composite to the flux state at high speed immediately followed by slow speed mixing for 30 sec. Discharge composite melt.
Mixing Cycle 2 - Mix composite to the flux state at high speed and continue mixing at high speed for 30 sec. Discharge.
Mixing Cycle 3 - Similar to mixing cycle 2 except mix 30 sec. longer. Then discharge.

EXAMPLES 47, 48 AND FF

Three blends were prepared from 100 parts by weight of polypropylene and 100 parts by weight of calcium carbonate. To the blends of Examples 47 and 48 0.5 PHR and 1.0 PHR of Surfactant I respectively was added. Mixing cycle 2 as identified in Table X was employed for each blend and each blend was molded into test specimens. The Gardner impact strength after exposure and measurement at room temperature was determined as well as the Gardner impact strength after exposure to a temperature of 2° F. (−17° C.) for 16 hours followed by immediate testing. The results given in Table XI show the very significant improvement in Gardner impact strength for the blends of Examples 47 and 48 which contained Surfactant I over the blend which did not contain the surfactant. The Gardner impact strength for the blend of Example 48 is particularly striking because it exceeded the capability of the testing equipment and was more than 4 times the Gardner impact strength of the blend of Example FF which contained no surfactant. The blend of Example 48 was particularly striking also because its Gardner impact strength after long exposure to the low temperature of 2° F. was over 208 in-lbs/in. which was more than 7 times that of the blend of Example FF.

TABLE XI

50% CaCO₃ FILLED POLYPROPYLENE (UNSTABILIZED)

| Example | FF | 47 | 48 |
|---|---|---|---|
| PP-1 (Pro-Fax 6501), wt. pts. | 100 | 100 | 100 |
| CaCO₃ (Vicron 15-15), wt. pts. | 100 | 100 | 100 |
| Surfactant I, PHR | 0 | 0.5 | 1.0 |
| Banbury (Size OO) Mixing Cycle | 2 | 2 | 2 |
| Gardner Impact Strength After Exposure and Measurement at Room Temperature, in-lbs/in | 144 | 320 | >672* |
| Gardner Impact Strength After Exposure to 2° F. (−17° C.) for 16 Hours Followed by Immediate Testing, in-lbs/in | 28 | — | 208 |

NOTE:
Mixing Cycle 2 is described in Table X.
*Limit of test equipment and toughness of composite prevented the recording of the minimum value.

EXAMPLES 49-60, GG AND HH

Blends of polypropylene and calcium carbonate were prepared from the components and amounts of components identified in Table XII. The amounts of Surfactant I and/or Additives I and/or II in the amounts identified in Table XII were added to the blends and in Example GG 0.2 PHR of glacial acetic acid was added. In these examples the Charpy impact strength was measured and the values determined are given in Table XII. Examples 49-54 illustrate the improvement in Charpy impact strength caused by the inclusion of increasing amounts of Surfactant I or Additive I. Example GG illustrates the adverse effects of glacial acetic acid on the physical properties of the composite. Examples 56-60 illustrate the advantageous effect of the addition of Surfactant I or Additives I and/or II. The test specimens of Example 56 did not break in the Charpy impact test as compared to Example HH where the average Charpy impact strength was 22 ft-lbs/in. Similarly, in the composite of Examples 59 and 60, four out of five specimens did not break and the fifth broke at a higher value than the average four specimens made from the Example HH blend.

EXAMPLES 61-69 AND II-NN

In these examples blends of highly stabilized polypropylene and calcium carbonate of the type and amounts identified in Table XIII were prepared. In Examples 61-68 the amounts of Surfactant I identified in Table XIII were added to the respective blends. In Example 69, 0.5 PHR of Surfactant IV was added to the blend. Each blend was thoroughly mixed, melted and molded into test specimens. The physical properties of each specimen of the blends were measured and are given in Table XIII. Examples 62 and 63 as well as Examples 64-63 illustrate the improvement in Charpy impact strength obtained by increasing the amount of Surfactant I. Example 63 illustrates the superior Charpy impact strength of the blend containing 0.7 PHR Surfactant I as compared to Example HH which contained no surfactant. In addition, comparisons of Example 66 with Example KK, Example 67 with Example MM, Example 68 with Example NN and Example 69 with Example KK illustrates improvements to Charpy impact strength through the use of a surfactant as shown by the data given in Table XIII.

TABLE XII

50% CaCO₃ FILLED POLYPROPYLENE

| Example | 49 | 50 | 51 | 52 | 53 | 54 | GG | 55 | 56 | 57 | 58 | 59 | 60 | HH |
|---|---|---|---|---|---|---|---|---|---|---|---|---|---|---|
| PP-2 Unstabilized, wt. pts. | 100 | → | → | → | → | → | → | → | — | 50 | 50 | — | — | — |
| PP-3 (Highly Stabilized) wt. pts. | — | — | — | — | — | — | — | — | 100 | 50 | 50 | 100 | 100 | 100 |
| CaCO₃ (Millicarb) wt pts. | 100 | → | → | → | → | → | → | → | → | → | → | → | → | → |
| Surfactant I, PHR | 0.5 | 1.0 | — | — | — | — | — | — | 0.5 | — | — | — | — | — |
| Additive I, PHR | — | — | 1.0 | 2.0 | 3.0 | 0.65 | 0.65 | — | — | 2.0 | 0.65 | 2.0 | 0.65 | — |
| Additive II, PHR | — | — | — | — | — | 1.35 | 1.35 | 4.0 | — | — | 1.35 | — | 1.35 | — |
| Glacial Acetic Acid, PHR | — | — | — | — | — | — | 0.2 | — | — | — | — | — | — | — |
| Tensile @ Yield, psi | 2770 | 2680 | 3790 | 3890 | 3970 | 4460 | 3940 | 4640 | 2690 | 2940 | 2990 | 2840 | 2900 | 2730 |
| Elongation @ Yield, % | 2.0 | 1.5 | 3.6 | 4.3 | 4.2 | 4.7 | 3.0 | 4.5 | 3.2 | 2.2 | 2.2 | 2.5 | 2.8 | 2.5 |
| Tangent Flex Modulus psi × 10³ | 455 | 457 | 527 | 500 | 489 | 522 | 508 | 523 | 429 | 393 | 413 | 395 | 392 | 451 |
| Flexural Yield Strength psi | 6210 | 6050 | 7990 | 8090 | 8340 | 8940 | 7850 | 9160 | 6190 | 6560 | 6590 | 6370 | 6350 | 5830 |
| Charpy Impact Strength, Ft-lbs/in (notched) | 7.2 ± 1.0 | 8.9 ± 2.0 | 10.2 ± 1.0 | 12.6 ± 0.5 | 14.4 ± 0.3 | 15.8 ± 1.3 | 8.8 ± 0.2 | 18.8 ± 0.8 | NB[1] — | 24[2] ± 6.9 | 20.5 ± 3.3 | NB[3] — | NB[4] — | 22 ± 5.0 |
| HDT @ 264 psi, °C. | 76 | 64 | 70 | 81 | 77 | 85 | 76 | 82 | 66 | 66 | 67 | 62 | 67 | 70 |

[1] All 5 specimens did not break
[2] One specimen did not break
[3] 4 specimens did not break; 1 specimen had value of 34
[4] 4 specimens did not break; 1 specimen had value of 29.4

TABLE XIII

CaCO₃ FILLED POLYPROPYLENE

| Example | 61 | 62 | 63 | 64 | 65 | 66 | 67 | 68 | 69 |
|---|---|---|---|---|---|---|---|---|---|
| PP-3 (highly stabilized) wt. pts. | 100 | → | → | → | → | → | → | → | → |
| CaCO₃ (Millicarb), wt. pts. | 43 | 100 | 100 | 233 | 233 | 233 | — | — | 233 |
| CaCO₃ (Durcal 2), wt. pts. | — | — | — | — | — | — | 100 | 233 | — |
| Filler % by weight | 30 | 50 | 50 | 70 | 70 | 70 | 50 | 70 | 70 |
| Surfactant I, PHR | 0.2 | 0.2 | 0.7 | 0.2 | 0.5 | 0.9 | 0.7 | 0.9 | — |
| Surfactant IV, PHR | — | — | — | — | — | — | — | — | 0.5 |
| Tensile @ Yield, psi | 2620 | 2560 | 2640 | 2260 | 2240 | 2150 | 2690 | 2110 | 2180 |
| Elongation @ Yield, % | 3.1 | 3.1 | 3.2 | 0.5 | 0.5 | 0.5 | 2.3 | 0.6 | 0.5 |
| Tangent Flex Modulus psi × 10³ | 378 | 381 | 395 | 622 | 612 | 565 | 419 | 595 | 696 |
| Flexural Yield Strength, psi | 5790 | 5270 | 5710 | 4610 | 4780 | 4780 | 6000 | 4480 | 4410 |
| Charpy Impact Strength, Ft-lbs/in (notched) | 18 | 17 | NB* | 3.1 | 2.6 | 4.7 | 24 | 2.1 | 3.5 |
| HDT @ 264 psi, °C. | 60 | — | — | 79 | 78 | 75 | 66 | 78 | 78 |

| Example | II | JJ | HH | KK | LL | MM | NN |
|---|---|---|---|---|---|---|---|
| PP-3 (highly stabilized) wt. pts. | → | → | → | → | → | → | → |
| CaCO₃ (Millicarb), wt. pts. | 43 | 43 | 100 | 233 | — | — | — |

TABLE XIII-continued

CaCO₃ FILLED POLYPROPYLENE

| | | | | | | | |
|---|---|---|---|---|---|---|---|
| CaCO₃ (Durcal 2), wt. pts. | — | — | — | — | 43 | 100 | 233 |
| Filler, % by weight | 30 | 30 | 50 | 70 | 30 | 50 | 70 |
| Surfactant I, PHR | — | — | — | — | — | — | — |
| Surfactant IV, PHR | — | — | — | — | — | — | — |
| Tensile @ Yield, psi | 3270 | 3330 | 2730 | 2390 | 3510 | 2940 | 2400** |
| Elongation @ Yield, % | 4.8 | 5.4 | 2.5 | 0.5 | 5.3 | 2.3 | 0.5 |
| Tangent Flex Modulus psi × 10³ | 301 | 293 | 451 | 752 | 319 | 448 | 731 |
| Flexural Yield Strength, psi | 6190 | 6120 | 5830 | 4540 | 7030 | 6200 | 4740 |
| Charpy Impact Strength, Ft-lbs/in (notched) | 22¹ ± 6.7 | 25 ± 3.1 | 22 ± 5.0 | 3.2 ± 0.6 | 20 ± 4.9 | 20 ± 5.4 | 1.6 ± 0.2 |
| HDT @ 264 psi, °C. | 66 | 63 | 70 | 94 | 65 | 75 | 90 |

*4 specimens did not break; 1 specimen had value of 29
¹3 out of 5 specimens did not break
**broke @ yield point

EXAMPLES 70 AND OO

In Example 70, three grams of Surfactant I were added drop wise to 1500 grams of relatively large particle size alumina trihydrate being ground in a Ball Mill mixer. In Example OO 1500 grams of the same type of alumina trihydrate was ground in a Ball Mill mixer. After 9.5 hours of grinding in each case the alumina trihydrate of Example OO was packed to one end whereas the alumina trihydrate treated with Surfactant I in Example 70 was still free flowing. After 12.5 hours the treated alumina trihydrate of Example 70 was still free flowing. This example illustrates the advantages obtained by adding the surfactant during the grinding operation of relative coarse mine fillers to a suitable fineness for use in incorporation into thermoplastics. Example 70 also illustrates a test by which surfactants can be tested for application in the present invention. The other additives including the polymerizable unsaturated silane and the polymerizable unsaturated organic compound when employed can also be added to the grinding stage by which mine fillers are ground to a fineness suitable for use as fillers in thermoplastics.

EXAMPLES 71 AND PP-UU

In these examples, blends were made from high density polyethylene and ATH in the amounts listed in Table XIV. In Example PP the ATH was pretreated with 1% based on the weight of the filler of TTA. In Example UU the ATH was pretreated with 1% based on the weight of filler of MAPTS. In Examples QQ-TT the ATH was pretreated with the relative amounts of TTA and MAPTS as designated in Table XIV. In each case the pretreatment was conducted by subjecting the ATH and additive to high intensity mixing such as in a Henschel or twin-shell blender equipped with a revolving high rpm intensifier, mixing blade to prevent agglomeration. The additive is added slowly at a steady flow rate to prevent agglomeration. In Example 71, 0.5% of each of MAPTS, TTA and Surfactant I based on the weight of filler was integrally added to the mixer of ATH and polyethylene which were in the powder form by mixing all ingredients in a Hobart mixer using a wire type mixing blade. The pretreated ATH of Examples PP-UU were also mixed with the polyethylene in a Hobart mixer. Thereafter, all mixtures were fluxed on a roll mill at about 365° F. During fluxing, the blend of Example 71 appeared to be somewhat lower in melt rheology (as determined visually) as compared to the blends of Examples PP-UU. After each blend solidified to room temperature, the solidified blends of Examples PP-UU were relatively easy to break up with a hammer. The solidified blend of Example 71, however, was very difficult to break up with a hammer. This example illustrates the recognition of improved impact properties to be obtained by the integral addition of a surfactant, a polymerizable unsaturated saline and a polymerizable unsaturated organic compound.

The physical properties of the specimens of Examples RR and 71 were measured and are presented in Table I under Examples C and 2, respectively.

TABLE XIV

| Example | PP | QQ | RR | SS | TT | UU | 71 |
|---|---|---|---|---|---|---|---|
| HDPE (0.78), Lbs. | 2.4 | 2.4 | 2.4 | 2.4 | 2.4 | 2.4 | 2.4 |
| ATH, Lbs. | 3.64 Pretreated | 3.64 → | 3.64 → | 3.62 → | 3.64 → | 3.64 → | 3.64 Integral |
| MAPTS, %* | — | 0.25 | 0.5 | 0.25 | 0.75 | 1.0 | 0.5 |
| TTA, %* | 1.0 | 0.75 | 0.5 | 0.25 | 0.25 | — | 0.5 |
| Surfactant I, %* | — | — | — | — | — | — | 0.5 |

*Based on weight of filler

What is claimed is:

1. An integral additive for improving the physical properties of thermoplastic organic polymer filled with inorganic fillers comprising a mixture of (1) a polymerizable unsaturated silicon compound having one to five silicon atoms interconnected by ≡SiOSi≡ linkages when said compound contains more than one silicon atom per molecule, contains at least one silicon-bonded vinyl-polymerizable unsaturated group, and contains at least one silicon-bonded hydrolyzable group when said compound contains one silicon atom per molecule and wherein any valences of silicon not satisfied by oxygen of the ≡SiOSi≡ linkage, by a silicon-bonded hydrolyzable group or by a silicon-bonded vinyl polymerizable unsaturated group are satisfied by a monovalent hydrocarbon group free of vinyl-polymerizable unsaturation, and/or a polymerizable unsaturated organic compound having at least two polymerizable unsaturated groups and (2) a surfactant comprising: (a) a siloxane containing at least one silicon-bonded alkyl group having at least 12 carbon atoms.

2. Integral additive as claimed in claim 1 containing 0 to 90 wt. % of vinyl-polymerizable unsaturated hydrolyzable silane, 0 to 90 wt. % of said polymerizable unsaturated organic compound, and 5 to 95 wt. % of said surfactant as defined in claim 1, the combined amount of said silane and said organic compound being 5 to 95 wt. %, all said wt. %'s being based on the combined weight of said silane, said organic compound and said surfactant.

3. Integral additive as claimed in claim 2 wherein said silane is vinlytriethoxysilane.

4. Integral additive as claimed in claim 2 wherein said surfactant is represented by the average formula:

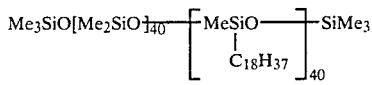

wherein Me is methyl.

5. Integral additive as claimed in claim 17 containing said polymerizable unsaturated hydrolyzable silane and said surfactant as defined in claim 1.

6. Integral additive as claimed in claim 2 containing said polymerizable unsaturated organic compound and said surfactant.

7. In an integral additive for improving the physical properties of thermoplastic organic polymer filled with inorganic fillers the improvement of providing a mixture essentially of
   (1) two interfacial agents wherein one agent is gamma-methacryloxypropyltrimethoxysilane and the other agent is trimethylol propane triacrylate, and
   (2) a surfactant represented by the average formula:

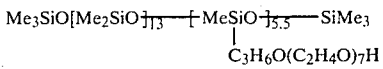

in which Me is methyl.

8. An integral additive for improving the physical properties of thermoplastic organic polymer filled with inorganic fillers comprising a mixture of (1) a vinyl-polymerizable unsaturated hydrolyzable silane which is gamma-methacryloxyropyltrimethoxysilane, (2) a polymerizable unsaturated organic compound which is trimethylolpropane triacrylate and (3) a surfactant which is a polyoxyethylenepolysiloxane block copolymer represented by the average formula:

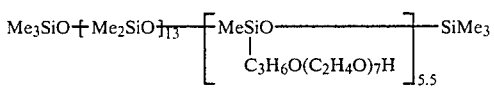

in which Me is methyl.

* * * * *